United States Patent

Nukatsuka et al.

[11] Patent Number: 5,680,799
[45] Date of Patent: Oct. 28, 1997

[54] SHIFT LEVER DEVICE

[75] Inventors: Michio Nukatsuka, Toyohashi; Takao Murakami, Hamamatsu; Takehiro Kuroda, Atsugi; Koji Kuriki, Zama, all of Japan

[73] Assignees: Fuji Kiko Co., Ltd., Tokyo; Nissan Motor Co., Ltd., Yokohama, both of Japan

[21] Appl. No.: 620,672

[22] Filed: Mar. 26, 1996

[30] Foreign Application Priority Data

Mar. 31, 1995 [JP] Japan ..................... 7-074824

[51] Int. Cl.⁶ ............. G05G 25/04; F16H 59/04; F16H 63/38
[52] U.S. Cl. ............. 74/566; 74/473 R; 74/538
[58] Field of Search ............. 74/473 R, 538, 74/566

[56] References Cited

U.S. PATENT DOCUMENTS 3,285,093  11/1966  Sellmeyer .................. 74/566
3,998,109  12/1976  O'brien ................... 74/538 X
4,565,151   1/1986  Buma ..................... 74/566 X

FOREIGN PATENT DOCUMENTS 6-137413  5/1994  Japan ..................... 74/566

Primary Examiner—Allan D. Herrmann
Attorney, Agent, or Firm—Foley & Lardner

[57] ABSTRACT

A shift lever device for an automatic transmission has a pivotally moveable shift lever. A case receives a lower portion of the shift lever. The case has an interior which is divided into first and second spaced portions. A shift lock mechanism has sensitive electric parts installed in only the second portion. A water stopper member is mounted to the lower portion of the shift lever. The water stopper member is so arranged and constructed as to positively guide liquid flowing down on and along the shift lever and reached thereto, toward only the first portion thereby to protect the sensitive electric parts from the liquid.

9 Claims, 5 Drawing Sheets

SHIFT LEVER DEVICE

BACKGROUND OF THE INVENTION

1. Field of the Invention

The present invention relates to shift lever devices for an automatic transmission of a motor vehicle, and more particularly to shift lever devices of waterproof type. More specifically, the present invention is concerned with shift lever devices of a type that can protect internal electric parts of the device even when dashed thereover with a liquid material, such as, juice or the like.

2. Description of the Prior Art

Various shift lever devices have been proposed and put into practical use in the field of automotive automatic transmission. Some of them are of a type in which a shift lever moves straightly in and along an elongate aperture formed in a gear position indication hoard with the characters "P", "R", "N", "D", "2" and "1" marked along the elongate aperture in order. For covering the elongate aperture of the indication board, a slide sheet through which the shift lever passes is arranged beneath the gear position indication board in a manner to slide together with the shift lever. A shift lock mechanism is incorporated with the shift lever device to lock the shift lever t "P" and/or "N" position. That is, due to the work the shift lock mechanism, inadvertent movement of the shift lever from "P" position toward "D" position and/or from "N" position to "R" position is suppressed.

During driving of the motor vehicle, a driver (or front seat passenger) sometimes can drop a canned juice or the like causing the exposed portion of the shift lever device to be dashed with the juice. In this case, the liquid splashed over the shift lever thereafter flows down gradually therealong and finally enters the inside of the shift lever device where various electric parts, such as switches, solenoids and the like of the shift lock mechanism are installed. Thus, if sufficient amount of the liquid reaches the inside the electric parts can be damaged.

SUMMARY OF THE INVENTION

Therefor, it is an object of the present invention to provide a shift lever device for an automotive automatic transmission, which is free of the above-mentioned drawback.

According to the present invention, there is provided a shift lever device for an automotive automatic transmission, which can assuredly protect the electric parts installed therein even when dashed thereover with a liquid.

According to a first aspect of the present invention, there is provided a shift lever device for an automatic transmission, which comprises a pivotally moved shift lever a case for receiving a lower portion of the shift lever, the case having an interior that is divided into first and second portions, which are spaced from each other; a shift lock mechanism having sensitive parts installed in only the second portion; and a water stopper member mounted to the lower portion of the shift lever, the water stopper member being so arranged and constructed as to positively guide a liquid flowing down on and along the shift lever toward only the first portion.

According to a second aspect of the present invention, there is provided a shift lever device for an automatic transmission, which comprises a pivotally moveable shift lever a supporting member fixed to a lower portion of the shift lever; a case for receiving both the lower portion of the shift lever and the supporting member, the case having an interior that is divided into first and second portions, which are spaced from each other; a shift lock mechanism having electric parts installed in only the second portion; a water stopper member detachably mounted to the lower portion of the shift lever, the water stopper member being so arranged and constructed as to positively guide liquid flowing down on and along an outer surface of the shift lever toward only the first portion; and a support member integral with the water stopper member, the support member being detachably connected to the supporting member in a snap action manner.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
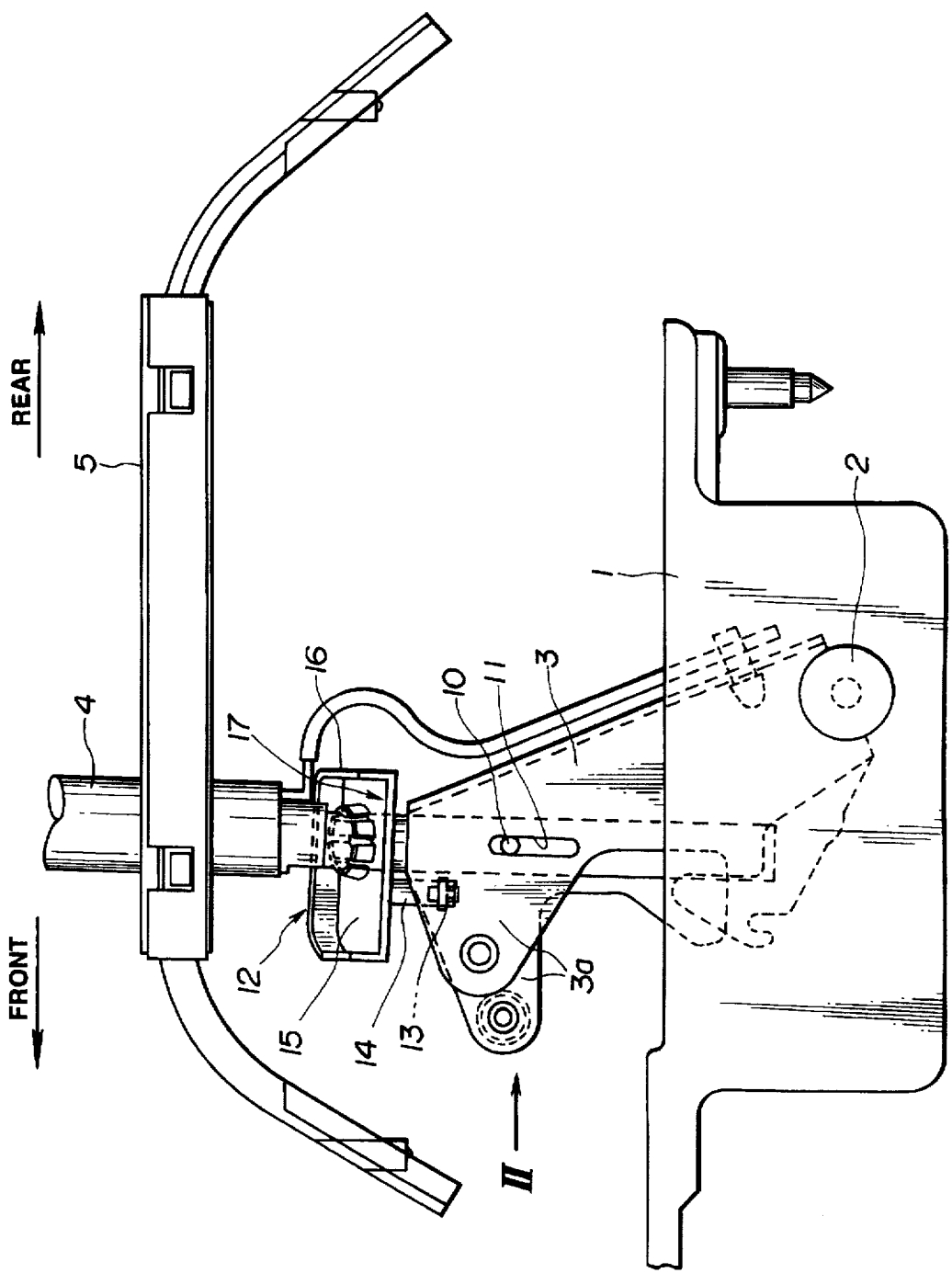
FIG. 1 is a side view of an essential portion of a shift lever device according to the present invention.

Referring to the drawings, particularly FIG. 1, there is shown but partially a shift lever device according to the present invention.

In FIG. 1, denoted by numeral 1 is a lower case secured to a vehicle body (not shown). A shaft 2 is installed in the lower case 1, which extends horizontally and transversely between opposed side walls of the lower case 1.

A supporting member 3 including opposed side walls 3a has a lower end pivotally connected to the shaft 2, so that the supporting member 3 can pivot forward and rearward about the shaft 2.

A tubular shift lever 4 is connected to the supporting member 3 to move therewith. More specifically, the shift lever 4 is tightly put between the opposed side walls 3a of the supporting member 3, as is understood from FIG. 4.

Figure 3:
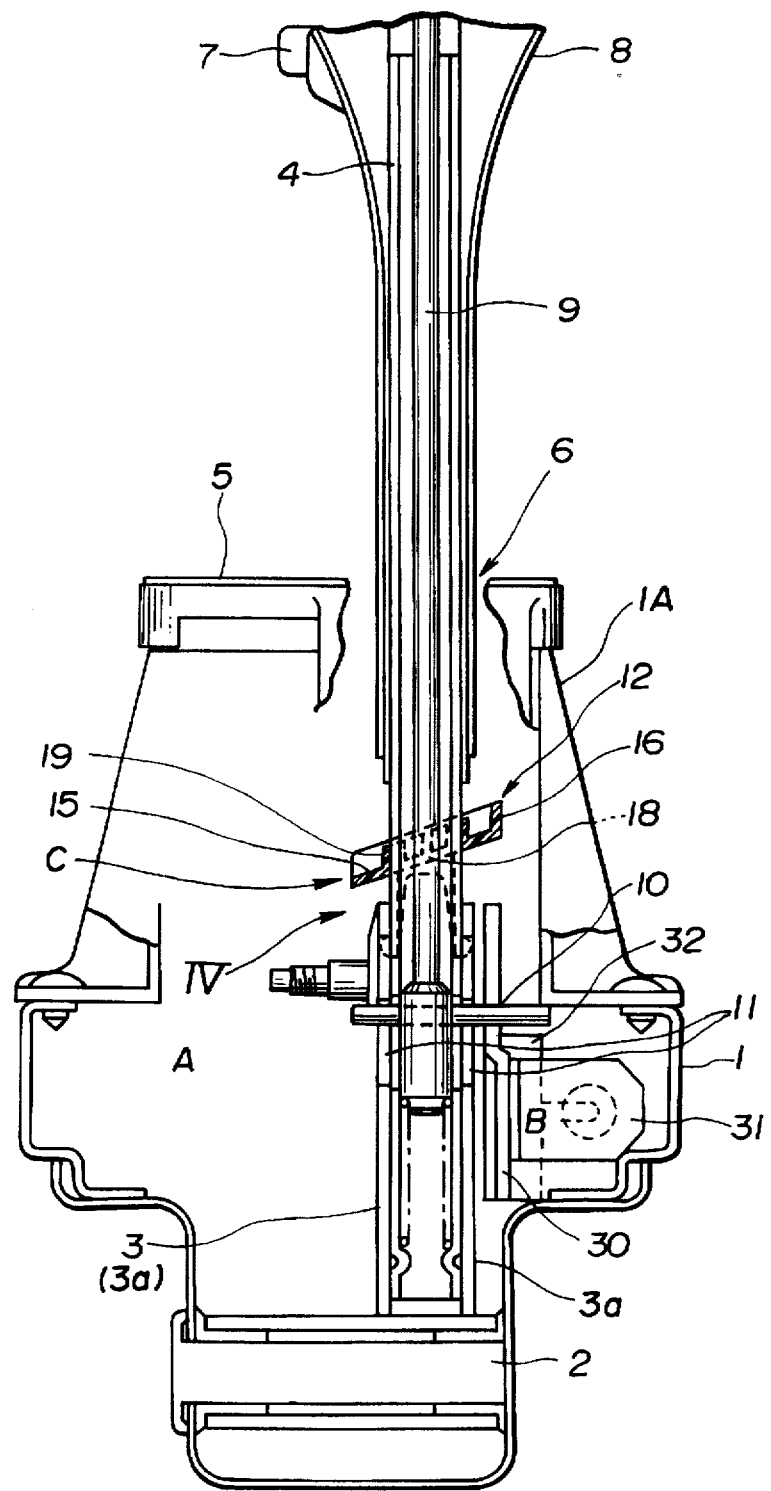
FIG. 3 is a partially cut front view of the shift lever device of the present invention.

As is understood from FIG. 3, the shift lever 4 passes through a longitudinally extending elongate aperture 6 formed in a gear position indication board 5 fixed to the vehicle body through a holder structure 1A. Although not shown in the drawing, a slide sheet through which the shift lever 4 passes is arranged just below the elongate aperture 6 to cover the same.

The gear position indication board 5 has the characters "P", "R", "N", "D", "2" and "1" marked thereon in order. The shift lever 4 has an enlarged head member 8 connected thereto through bolts or the like.

A lock release knob 7 is retractably connected to the head member 8 of the shift lever 4. A compression rod 9 engaged with the knob 7 is axially movably received in the tubular shift lever 4. The compression rod 9 has at a lower portion a position pin 10 fixed thereto. When the lock release knob 7 is pushed to assume a retracted position, the compression rod 9 is moved down causing the position pin 10 to slide downward in elongate slots 11 formed in the opposed side walls 3a of the supporting member 3. As is understood from FIG. 3, the elongate slots 11 are respectively merged with elongate slots (no numerals) formed in diametrically opposed portions of the tubular shift lever 4.

Upward and downward movement of the position pin 10 in the slots 11, which is induced when the lock release knob 7 is handled, causes engagement and disengagement of the position pin 10 with and from certain notches formed in a known position plate (not shown) secured to the lower case 1. That is, when the position pin 10 is caught by one of the notches, the shift lever 4 becomes locked at a corresponding gear position, such as "P" position or "N" position.

Thus, the knob 7, the compression rod 9, the position pin 10 and the position plate constitute a so-called "shift lock mechanism".

As is seen from FIG. 3, at the right lower area "B" of the shift lever 4, there are arranged various electric parts, such as a limit switch 32, a solenoid 31 and the like, which are associated with the shift lock mechanism. These electric parts 31 and 32 are mounted on a bracket 30.

As is best seen from FIGS. 1 and 3, a water stopper member 12 is mounted to the shift lever 4 below the gear position indication board 5. As will be described in detail hereinafter, the water stopper member 12 functions to stop or at least guide penetrating liquid, which has flowed from thereto along the shift lever 4, to a blank area "A" where the electric parts 31 and 32 of the shift lock mechanism are not positioned.

As will be seen from FIG. 3, the water stopper member 12 on the shift lever 4 is inclined toward the blank area "A".

Figure 2:
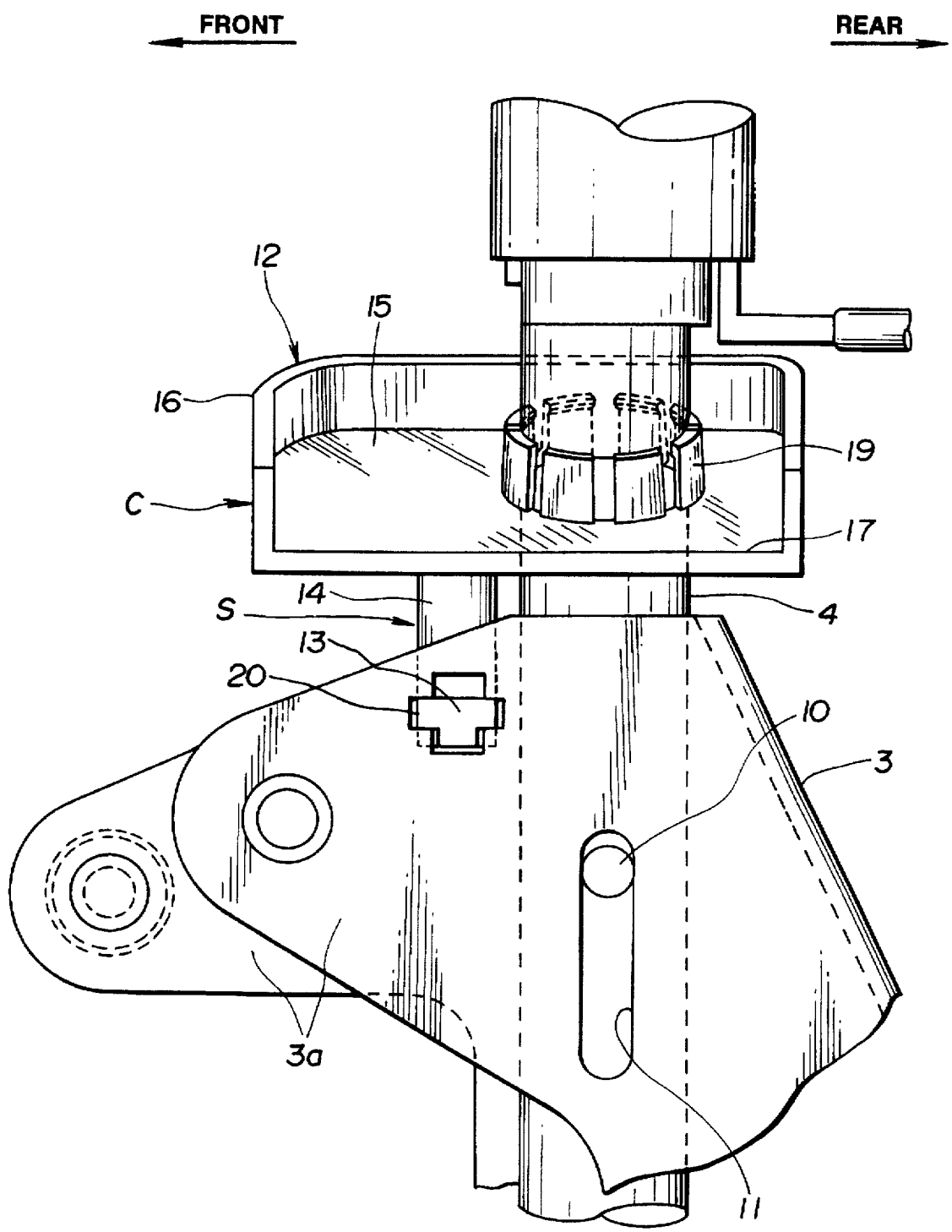
FIG. 2 is an enlarged view of the portion indicated by an arrow "II" in FIG. 1.

As is well shown in FIG. 2, the water stopper member 12 is of a one-piece member of molded plastic, which comprises generally a rectangular receptacle portion "C" slantly disposed on the shift lever 4 and a support portion "S" extending downward from the receptacle portion "C" toward the opposed side walls 3a of the supporting member 3.

The rectangular receptacle portion "C" comprises a rectangular bottom wall 15 whose three sides are surrounded by a wall 16. That is, the three sides of the rectangular bottom wall 15 possess the wall 16, while the remaining one side 17 does not have the wall 16. As will become apparent hereinafter, upon assembly, the open (or blank) side 17 is directed toward the blank area "A".

The bottom wall 15 is formed with an oval opening 18, which is surrounded by resilient lugs 19 raised from the periphery of the opening 18. As shown by FIG. 2, upon assembly, the opening 18 is intimately received on the shift lever 4 having the resilient lugs 19 pressed against the shift lever 4 and having the bottom wall 15 inclined relative to the shift lever 4, that is, slanted toward the blank area "A" with the open side 17 directed toward the area "A".

Figure 4:
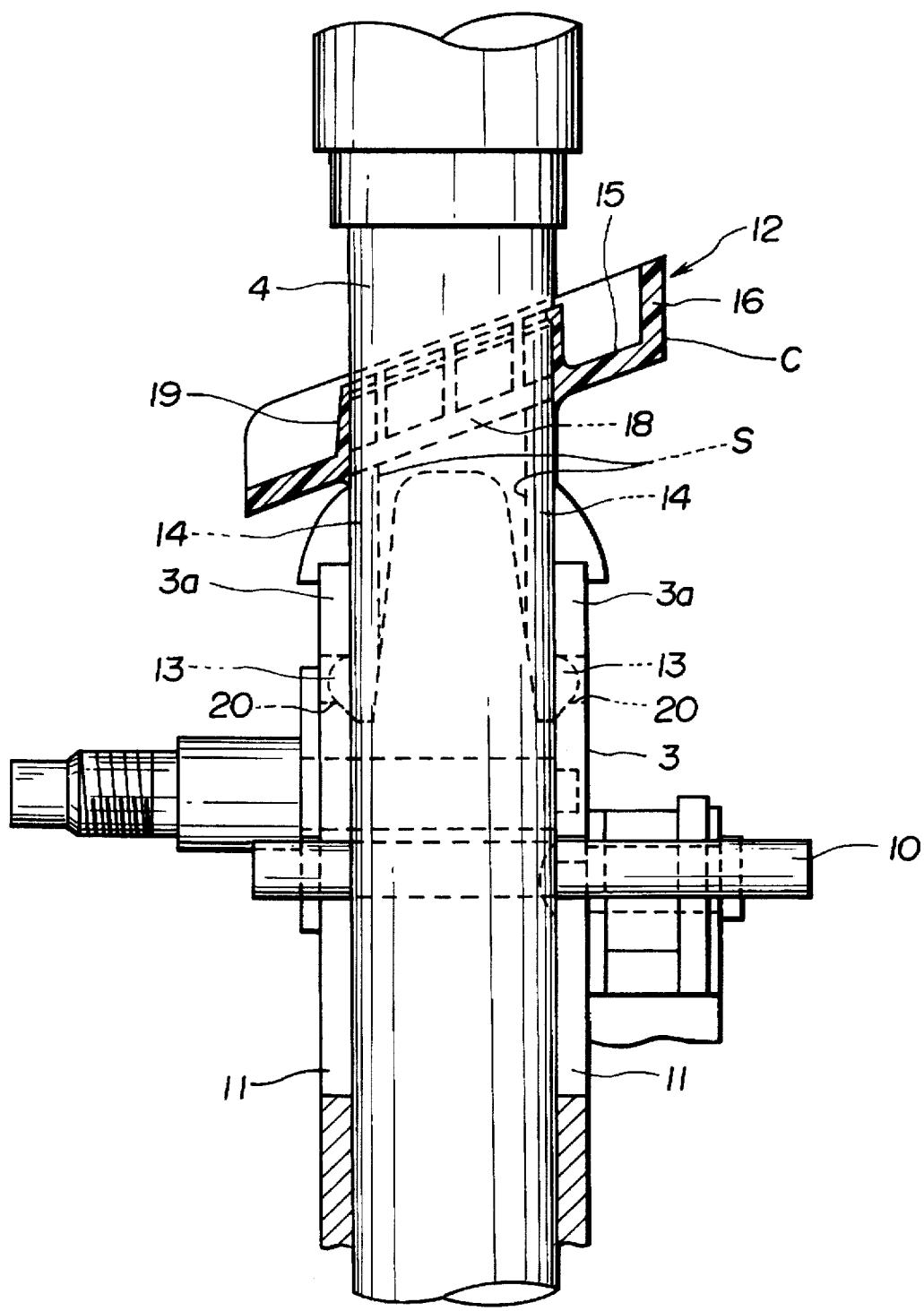
FIG. 4 is an enlarged view of the portion indicated by an arrow "IV" in FIG. 3.

As is seen from FIG. 4, the support portion "S" of the water stopper member 12 comprises two (longer and shorter) legs 14. Each of the legs 14 has at a lower end a spherical outward projection 13. Upon assembly, the projections 13 of the legs 14 are neatly mated with openings 20 formed in the opposed side walls 3a of the supporting member 3.

As has been described hereinabove, when the water stopper member 12 is properly mounted to the shift lever 4 in the above-mentioned manner, the receptacle portion "C" thereof is inclined toward the blank area "A" directing the open (or blank) side 17 of the bottom wall 16 toward the same.

The inclination angle of the receptacle portion "C" relative to the shift lever 4 is so determined as to cause any liquid on the bottom wall 15 to easily flow toward the open side 17 and finally drop therefrom to the blank area "A". However, due to the nature of the structure of the receptacle portion "C" having the open side 17 directed toward the blank area "A", such inclination may be small.

For mounting the water stopper member 12 to the proper position of the shift lever 4, the following steps can be taken.

With the head member 8 removed from the shift lever 4, the water stopper member 12 is put on the shift levers 4 having the legs 14 directed downward. Then, the water stopper member 12 is handled so that the oval opening 18 thereof becomes mated with the top of the shift lever 4. Then, the water stopper member 12 is slid down along the shift lever 4 to a position where the spherical projections 13 of the legs 14 are latchedly engaged with the openings 20 of the opposed side walls 3a of the supporting member 3.

Figure 5A:
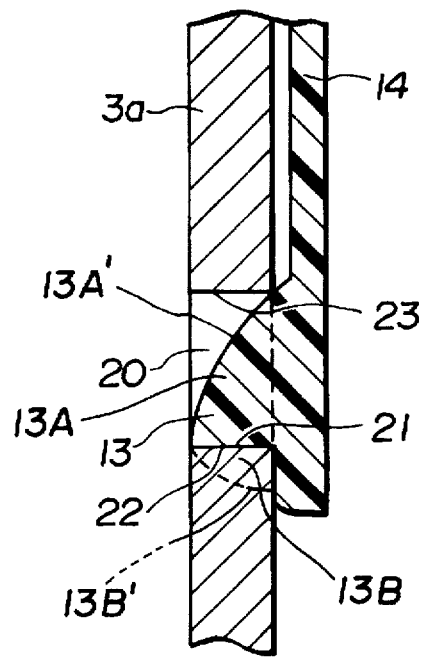
FIG. 5A is a sectional view showing a leg of a water stopper member and its associated parts employed in the invention, the view being taken from the direction of the arrow VA—VA of FIG. 5B.
Figure 5B:
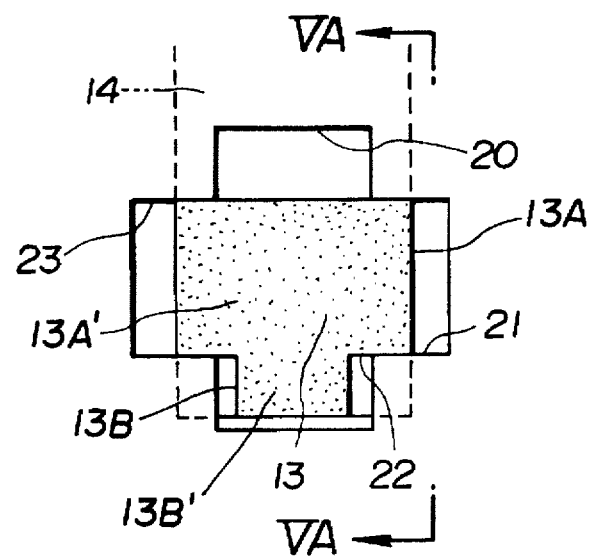
FIG. 5B is a front view showing the leg of the water stopper member and the associated parts employed in the invention.

The detailed construction of the spherical projection 13 of each leg 14 and that of the opening 20 of each side wall 3a are shown in FIGS. 5A and 5B.

As is seen from FIG. 5B, the opening 20 is a cross recess comprising a laterally enlarged middle portion that has both a lower edge 21 and an upper edge 23. While, as is understood from FIGS. 5A and 5B, the spherical projection 13 has a generally T-shaped form, which comprises a larger upper half 13A and a smaller lower half 13B, each having a spherical outer surface 13A' or 13B'. A lower edge defined by the larger upper half 13A is designated by numeral 22.

Upon mating between the projection 13 and the opening 20, the larger upper half 13A of the projection 13 is put in the laterally enlarged middle portion of the opening 20 having the lower edge 22 thereof mated with the lower edge 21 of the opening 20 and having the spherical outer surface 13A' thereof mated with the upper edge 23 of the opening 20. Furthermore, in this case, as shown in FIG. 5B, the smaller lower half 13B of the projection 13 is neatly put in a smaller lower part of the opening 20. Accordingly, the projection 13 of each leg 14 of the water stopper member 12 is assuredly caught by the opening 20 without play.

In the following, advantageous functions possessed by the water stopper member 12 will be described with reference to FIG. 3.

If a liquid, such as juice or the like, is splashed over the shift lever device, particularly, over the gear position indication board 5 and the shift lever 4, the liquid thereafter flows down on and along the shift lever 4 and comes to the water stopper member 12 through a slit defined between the slide sheet (not shown) and the shift lever 4. The liquid reaching the water stopper member 12 transfers to the inclined bottom wall 15 directly or through the resilient lugs 19. Due to the inclination possessed by the bottom wall 15, the liquid is forced to flow toward the open side 17 and finally drop therefrom to the blank area "A". Thus, the electric parts arranged in the area "B" are protected from the liquid.

Since the water stopper member 12 is installed in the shift lever device, external appearance of the device is not deteriorated. Furthermore, since mounting the water stopper member 12 of plastic to the shift lever 4 does not need any change in construction of the shift lever device, the water stopper member 12 can be a practical and economical article.

Although the above description is directed to the water stopper member 12 having a rectangular receptacle portion "C", the receptacle portion can "C" take other shapes, for example, circular, oval and polygonal shapes. Furthermore, the water stopper member 12 may be constructed of steel.

What is claimed is:

1. A shift lever device for an automatic transmission, comprising:

a pivotally movable shift lever;

a case for receiving a lower portion of said shift lever, said case having an interior with first and second portions, which are spaced from each other;

a shift lock mechanism having sensitive parts positioned in said second portion; and a water stopper member mounted to said lower portion of said shift lever, said water stopper member being adapted to positively guide liquid flowing down on and along said shift lever toward said first portion, wherein said water stopper member comprises a receptacle portion having an upwardly facing recess and a bottom wall mating with said shift lever.

2. A shift lever device as claimed in claim 1, in which said water stopper member is inclined toward said first portion to promote the liquid guide toward said first portion.

3. A shift lever device as claimed in claim 1, in which said bottom wall of said receptacle portion is inclined toward said first portion relative to said shift lever.

4. A shift lever device as claimed in claim 3, in which said receptacle portion has a surrounding wall extending upwardly from said bottom wall, said surrounding wall having an opening directed toward said first portion.

5. A shift lever device as claimed in claim 3, in which said bottom wall is formed with an opening through which said shift lever passes.

6. A shift lever device as claimed in claim 5, in which the opening of said bottom wall is surrounded by resilient lugs raised from a periphery of the opening, said resilient lugs being resiliently pressed against an outer surface of said shift lever.

7. A shift lever device as claimed in claim 2, in which said water stopper member includes a support portion adapted to latchedly engage a member fixed to said shift lever.

8. A shift lever device as claimed in claim 1, in which said water stopper member is constructed of a one piece member of molded plastic.

9. A shift lever device for an automatic transmission, comprising:

a pivotally movable shift lever;

a supporting member fixed to a lower portion of said shift lever;

a case for receiving both said lower portion of the shift lever and said supporting member, said case having an interior with first and second portions, which are spaced from each other;

a shift lock mechanism having electric parts positioned in said second portion;

a water stopper member detachably mounted to said lower portion of said shift lever, said water stopper member being adapted to positively guide liquid flowing down on and along an outer surface of said shift lever toward said first portion; and a support member integral with said water stopper member, said support member being detachably connected to said supporting member in a snap action manner.

* * * * *